US009973786B2

United States Patent
Gobara

(10) Patent No.: US 9,973,786 B2
(45) Date of Patent: May 15, 2018

(54) COMMUNICATION SYSTEM INCLUDING A FIRST COMMUNICATION MODE WITH A SERVER THAT IS CONCURRENT WITH A SECOND COMMUNICATION MODE WITH A P2P CLIENT, INFORMATION PROCESSING DEVICE, AND A COMMUNICATION METHOD

(71) Applicant: Panasonic Intellectual Property Management Co., Ltd., Osaka (JP)

(72) Inventor: Kunio Gobara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/023,387

(22) PCT Filed: Apr. 3, 2015

(86) PCT No.: PCT/JP2015/001898
§ 371 (c)(1),
(2) Date: Mar. 20, 2016

(87) PCT Pub. No.: WO2015/155966
PCT Pub. Date: Oct. 15, 2015

(65) Prior Publication Data
US 2016/0205423 A1    Jul. 14, 2016

(30) Foreign Application Priority Data

Apr. 11, 2014 (JP) ................................. 2014-081662
Jan. 30, 2015 (JP) ................................. 2015-017702

(51) Int. Cl.
*H04N 21/231* (2011.01)
*H04L 29/08* (2006.01)
(Continued)

(52) U.S. Cl.
CPC ....... *H04N 21/23109* (2013.01); *H04L 67/02* (2013.01); *H04L 67/104* (2013.01);
(Continued)

(58) Field of Classification Search
CPC ........... H04N 21/23109; H04N 21/482; H04N 21/47214; H04N 5/765; H04N 21/632;
(Continued)

(56) References Cited

U.S. PATENT DOCUMENTS

2003/0086023 A1    5/2003  Chung et al.
2003/0126277 A1*   7/2003  Son ........................ H04L 29/06
                                                        709/231
(Continued)

FOREIGN PATENT DOCUMENTS

JP        9-102827       4/1997
JP        2002-026942    1/2002
(Continued)

OTHER PUBLICATIONS

International Search Report of PCT application No. PCT/JP2015/001898 dated Jun. 30, 2015.
(Continued)

*Primary Examiner* — Hoang Vu A Nguyen Ba
(74) *Attorney, Agent, or Firm* — McDermott Will & Emery LLP

(57) ABSTRACT

An information processing device includes a display recording list receiver that receives display information for displaying a list of one or more content items from a server through a first connection made based on a first communication mode. Moreover, the information processing device includes: a P2P connection implementation unit that establishes, between a receiving device and the information processing device, a second connection made based on a second communication mode for performing communica-
(Continued)

tion between the receiving device and information processing device without passing via the server; a recorded program selector that selects a content item out of the one or more content items based on the display information; and a recorded program receiver that receives the selected content item from the receiving device through the second connection.

6 Claims, 13 Drawing Sheets

(51) Int. Cl.
*H04N 21/482* (2011.01)
*H04N 21/472* (2011.01)
*H04N 5/765* (2006.01)
*H04L 29/06* (2006.01)
*H04N 21/63* (2011.01)
*H04N 21/433* (2011.01)
*H04N 21/432* (2011.01)

(52) U.S. Cl.
CPC ...... *H04L 67/1063* (2013.01); *H04L 67/1091* (2013.01); *H04L 67/42* (2013.01); *H04N 5/765* (2013.01); *H04N 21/23116* (2013.01); *H04N 21/432* (2013.01); *H04N 21/4334* (2013.01); *H04N 21/47214* (2013.01); *H04N 21/482* (2013.01); *H04N 21/632* (2013.01)

(58) Field of Classification Search
CPC ............. H04N 21/4334; H04N 21/432; H04N 21/23116; H04L 67/1063; H04L 67/1091; H04L 67/02; H04L 67/42; H04L 67/104
See application file for complete search history.

(56) References Cited

U.S. PATENT DOCUMENTS

| | | |
|---|---|---|
| 2005/0251827 A1 | 11/2005 | Ellis et al. |
| 2007/0232221 A1 | 10/2007 | Miyata |
| 2008/0117922 A1 | 5/2008 | Cockrell et al. |
| 2009/0077046 A1 | 3/2009 | Narahara et al. |
| 2009/0210533 A1 | 8/2009 | Verhaegh et al. |
| 2009/0288127 A1 | 11/2009 | Corson et al. |
| 2009/0313658 A1 | 12/2009 | Nishimura et al. |
| 2015/0003815 A1* | 1/2015 | Hill .................. H04N 21/42209 386/297 |
| 2016/0344745 A1* | 11/2016 | Johnson .................. H04L 67/34 |

FOREIGN PATENT DOCUMENTS

| | | |
|---|---|---|
| JP | 2003-163869 | 6/2003 |
| JP | 2005-085146 | 3/2005 |
| JP | 2005-252403 | 9/2005 |
| JP | 2008-118677 | 5/2008 |
| JP | 2009-089432 | 4/2009 |
| JP | 2009-189059 | 8/2009 |
| JP | 2010-200380 | 9/2010 |
| JP | 2012-029200 | 2/2012 |

OTHER PUBLICATIONS

J. Rosenberg, J. Weinberger, C. Huitema, R. Mahy, "STUN—Simple Traversal of User Datagram Protocol (UDP) Through Network Address Translators (NATs)", [Online], Mar. 2003, Network Working Group Request for Comments 3489, [searched on Mar. 23, 2014], Internet <URL: http://www.ieff.org/rfc/rfc3489.txt>.

The Extended European Search Report dated Feb. 1, 2017 for the related European Patent Application No. 15776163.6.

The Extended European Search Report dated Feb. 1, 2017 for the related European Patent Application No. 15776776.5.

Final Office Action issued in related U.S. Appl. No. 15/023,682, dated Oct. 13, 2017.

International Search Report of PCT application No. PCT/JP2015/001899 dated Jun. 30, 2015.

Non-Final Office Action issued in related U.S. Appl. No. 15/023,682, dated May 5, 2017.

* cited by examiner

FIG. 9

| DEVICE ID | ch | RECORDING STARTING DATE AND TIME | RECORDING ENDING DATE AND TIME | PROGRAM NAME | CONTENT ID | UPDATE DATE AND TIME |
|---|---|---|---|---|---|---|
| 123400 | 101 | 2013/04/27 09:25 | 2013/04/27 09:50 | Body and Tim | 98af | 2013/04/27 08:00 |
| 123400 | 101 | 2013/04/27 09:50 | 2013/04/27 10:35 | You and me | 321b | 2013/04/27 08:00 |
| 123400 | 101 | 2013/04/27 10:35 | 2013/04/27 11:00 | Dance Rev | 3422 | 2013/04/27 08:00 |
| ......... | ......... | ......... | ......... | ......... | ......... | ......... |
| 123400 | 102 | 2013/04/30 21:45 | 2013/04/30 22:30 | The Bobs | 30bf | 2013/04/27 08:00 |
| 123400 | 102 | 2013/04/30 22:30 | 2013/05/01 00:05 | History of Joh | f342 | 2013/04/27 08:00 |
| ......... | ......... | ......... | ......... | ......... | ......... | ......... |
| 123401 | 101 | 2013/04/27 09:25 | 2013/04/27 09:50 | Body and Tim | 98af | 2013/04/27 08:11 |
| 123401 | 101 | 2013/04/27 09:50 | 2013/04/27 10:35 | You and me | 321b | 2013/04/27 08:11 |
| 123401 | 101 | 2013/04/27 10:35 | 2013/04/27 11:00 | Dance Rev | 3422 | 2013/04/27 08:11 |

COMMUNICATION SYSTEM INCLUDING A FIRST COMMUNICATION MODE WITH A SERVER THAT IS CONCURRENT WITH A SECOND COMMUNICATION MODE WITH A P2P CLIENT, INFORMATION PROCESSING DEVICE, AND A COMMUNICATION METHOD

CROSS-REFERENCE TO RELATED APPLICATIONS

This application is a U.S. national stage application of the PCT International Application No. PCT/JP2015/001898 filed on Apr. 3, 2015, which claims the benefit of foreign priority of Japanese patent applications 2014-081662 filed on Apr. 11, 2014 and 2015-017702 filed on Jan. 30, 2015, the contents all of which are incorporated herein by reference.

TECHNICAL FIELD

The present disclosure relates to a communication system or the like, which transmits, from a storage storing one or more content items, at least one of the one or more content items to an information processing device for reproducing the content item.

BACKGROUND ART

As a technique for remotely controlling an electronic device with accuracy even from a remote location, a communication system as described in PTL 1 is known. In the communication system described in PTL 1, a portable terminal operated by a user, a database, a video recorder and a base station communicate with one another via a network. In the database, as information required for a VTR (Videotape Recorder) to make a recording reservation, a program guide is recorded, which includes, for example, broadcast channels, broadcast starting times and the like of broadcast programs. The portable terminal of the user communicates with the database via the base station and the network, to receive the program guide from the database and display the program guide. The user refers to the program guide, and confirms a broadcast channel, broadcast starting time and the like of a program to be subjected to the recording reservation. Then, the user issues an instruction on the program to be subjected to the recording reservation to the portable terminal. Information on the program on which the instruction is issued by the user is transmitted from the portable terminal via the base station and the network to the VTR. In this manner, the VTR executes the recording reservation based on the received information on the program. As described above, the user can allow the VTR to make the recording reservation by using the portable terminal from any location as long as the location is in an environment where the portable terminal connects to the network.

Moreover, in NPL 1, there is disclosed a technique in which two terminals belonging to different networks perform communication by the Peer to Peer connection that does not pass via a server. In this manner, a load on the server can be reduced. Note that the "Peer to Peer" is hereinafter referred to as "P2P".

CITATION LIST

Patent Literature

PTL 1: Unexamined Japanese Patent Publication No. H09-102827

Non-Patent Literature

NPL 1: J. Rosenberg, J. Weinberger, C. Huitema, R. Mahy, "STUN—Simple Traversal of User Datagram Protocol (UDP) Through Network Address Translators (NATs)", [Online], March 2003, Network Working Group Request for Comments: 3489, [searched on Mar. 23, 2014], Internet <URL: http://www.ietf.org/rfc/rfc3489.txt>

SUMMARY OF THE INVENTION

The present disclosure provides a communication system that realizes an operation, which does not give a feeling of inconvenience to a user, while reducing a load on a server.

A communication system in the present disclosure includes a storage that stores one or more content items, a server, and an information processing device for reproducing the content items. The information processing device includes: a display information receiver that receives display information for displaying a content list as a list of the one or more content items from the server through a first connection made based on a first communication mode; and a communication establishment unit that establishes a second connection between the storage and the information processing device, the second connection being made based on a second communication mode for performing communication between the storage and the information processing device without passing via the server. Moreover, the information processing device includes: a content selector that selects at least one content item out of the one or more content items based on the display information; and a content receiver that receives the at least one content item from the storage through the second connection established by the communication establishment unit, the at least one content item being selected by the content selector.

An information processing device in the present disclosure includes: a display information receiver that receives display information for displaying a content list as a list of one or more content items through a first connection made based on a first communication mode; and a communication establishment unit that establishes a second connection made based on a second communication mode different from the first communication mode. Moreover, the information processing device includes: a content selector that selects at least one content item out of the one or more content items based on the display information; and a content receiver that receives the at least one content item through the second connection established by the communication establishment unit, the at least one content item being selected by the content selector.

In accordance with the communication system, the information processing device and the communication method in the present disclosure, the operation that does not give the feeling of inconvenience to the user can be realized while reducing the load on the server.

BRIEF DESCRIPTION OF DRAWINGS

FIG. 9 is a diagram showing an example of data accumulated in a recording list accumulator in the exemplary embodiment.

DESCRIPTION OF EMBODIMENT

A description is made below in detail of an exemplary embodiment with reference to the drawings as appropriate. However, a detailed description more than necessary is omitted in some cases. For example, a detailed description of a well-known item and a duplicate description of substantially the same configuration are omitted in some cases. These omissions are made in order to avoid unnecessary redundancy of the following description and to facilitate the understanding of those skilled in the art.

Note that the inventor provides the accompanying drawings and the following description in order to allow those skilled in the art to fully understand the present disclosure, and does not intend to thereby limit the subject described in the scope of claims.

EXEMPLARY EMBODIMENT

A description is made below of an exemplary embodiment with reference to FIG. 1 to FIG. 13.
[1-1. Configuration]
[1-1-1. Schematic Configuration of Communication System]

Figure 1:
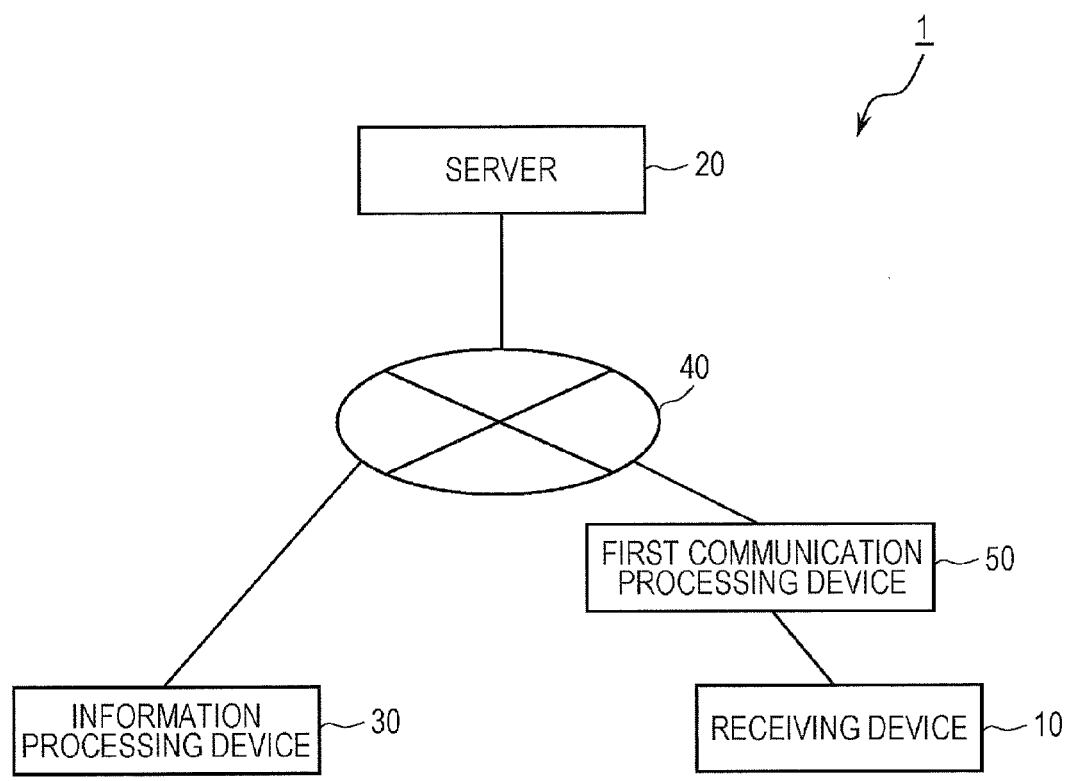
FIG. 1 is a diagram showing an example of a schematic configuration of a communication system in an exemplary embodiment.

FIG. 1 is a diagram showing an example of a schematic configuration of communication system 1 in an exemplary embodiment. In FIG. 1, communication system 1 includes: receiving device 10; server 20; information processing device 30; and first communication processing device 50.

Server 20, information processing device 30 and first communication processing device 50 are connected to communication network 40 via a wired or wireless communication line. Communication network 40 is, for example, the Internet. Moreover, receiving device 10 is connected to first communication processing device 50 via a wired or wireless communication channel.

First communication processing device 50 is a device (for example, a router, a firewall, a modem and the like) for connecting to communication network 40. That is, receiving device 10 is connected to communication network 40 via first communication processing device 50.

Information processing device 30 is connected to server 20 based on a first communication mode. Hereinafter, this connection that is based on the first communication mode is referred to as a first connection. Here, the first connection is established via communication network 40.

Moreover, information processing device 30 is connected to receiving device 10 based on a second communication mode. Hereinafter, this connection that is based on the second communication mode is referred to as a second connection. Here, the second connection is also established via communication network 40.

Note that a communication mode is a mode in which a procedure necessary to perform communication is determined. The communication mode is also called a communication architecture. For example, the communication mode is a client-server model, a P2P model and the like.

The first communication mode is a communication mode for performing the communication between information processing device 30 and server 20. The second communication mode is a communication mode different from the first communication mode, and is a communication mode for performing the communication between receiving device 10 and information processing device 30 without passing via server 20.

In this exemplary embodiment, an exemplary description is made of a case where the first communication mode is the client-server model, and where the second communication mode is the P2P model. That is, an exemplary description is made of a case where the first connection is a client-server connection, and where the second connection is a P2P connection.

Receiving device 10 is an example of a storage. Receiving device 10 stores one or more content items.

A content item refers to audio data, image data or video data, or an arbitrary combination of the audio data, the image data and the video data. For example, the content item is a recorded broadcast program (hereinafter, referred to as a recorded program). Moreover, for example, the content item may be visual/audio data obtained from a digital video camera. Furthermore, for example, the content item may be image data obtained from a digital still camera.

Here, receiving device 10 is a device capable of viewing and recording a broadcast program. Specifically, for example, receiving device 10 is a hard disk recorder, a DVD recorder, a BD (Blu-ray (registered trademark) Disc) recorder, a television set, a set top box and the like.

Information processing device 30 is a device for reproducing the content item. Specifically, information processing device 30 receives a content item, which is selected from a content list displayed on a user interface, from receiving device 10. Then, information processing device 30 reproduces the content item received from receiving device 10. For example, information processing device 30 is a PC (Personal Computer), a portable terminal, a smart phone, a tablet computer and the like. An example of the user interface of information processing device 30 will be described later with reference to FIG. 3. Configurations of information processing device 30, server 20 and receiving device 10 will be described later in detail with reference to FIG. 4 to FIG. 8.

Figure 2:
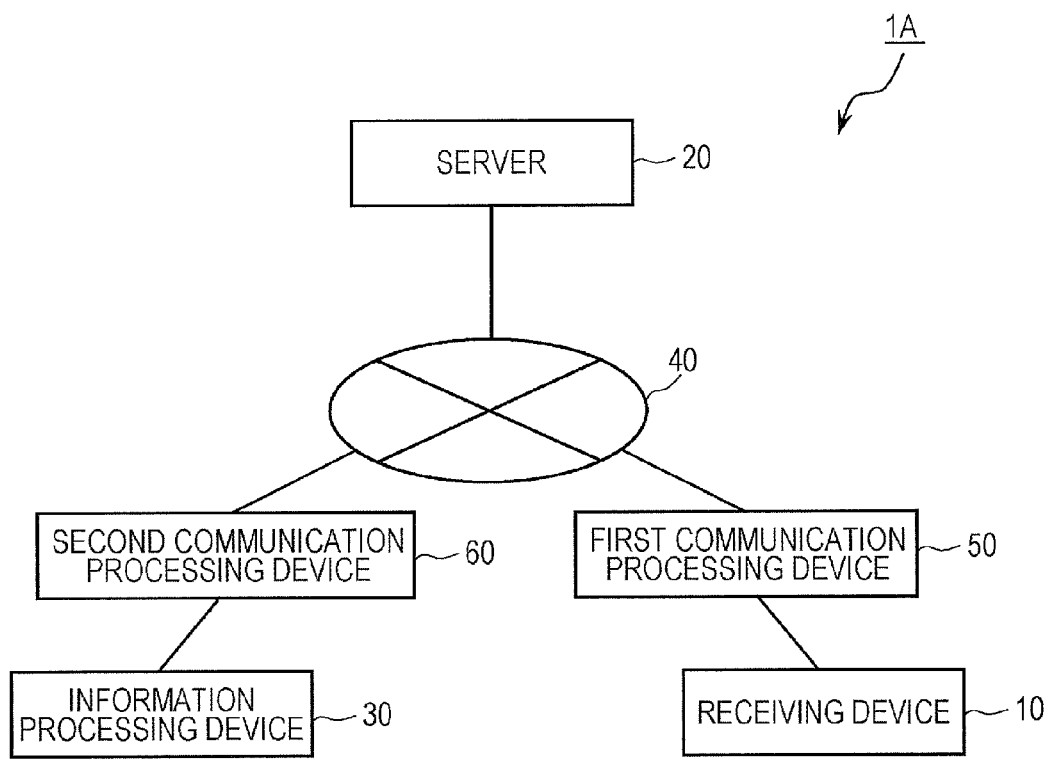
FIG. 2 is a diagram showing a modification example of the schematic configuration of the communication system in the exemplary embodiment.

FIG. 2 is a diagram showing a schematic configuration of communication system 1A in the exemplary embodiment. Communication system 1A is a modification example of communication system 1 of FIG. 1. Communication system 1A further includes second communication processing device 60. In communication system 1A, information processing device 30 is connected to communication network 40 via second communication processing device 60.

In this exemplary embodiment, there is no difference in effect regarding presence or absence of first communication processing device 50 and second communication processing device 60, and accordingly, a description of communication system 1A is omitted below.

Figure 3:
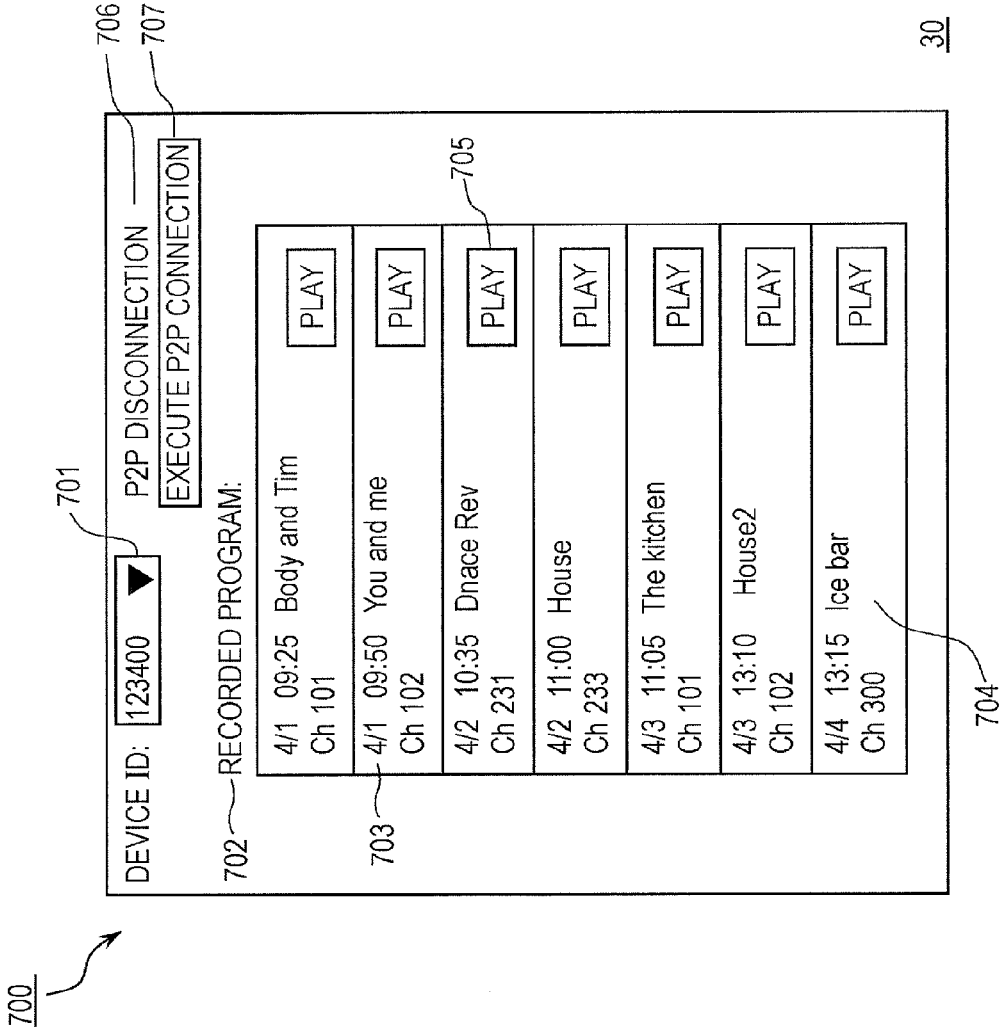
FIG. 3 is a diagram showing an example of a user interface of an information processing device according to the exemplary embodiment.

FIG. 3 is a diagram showing an example of user interface 700 which is provided to the user by information processing device 30. Here, a description is made of a case where the content item is the recorded program.

User interface 700 is a graphical user interface. User interface 700 is displayed on a screen of information processing device 30, and is thereby provided to the user. Here, user interface 700 includes registered device list 701, program list 702, and P2P connection state display 706.

Registered device list 701 is a list of device IDs of one or more receiving devices. The user selects one of one or more device IDs included in registered device list 701, and thereby selects a receiving device (for example, receiving device 10) as an operation target out of the one or more receiving devices.

Note that, in registered device list 701, there may be included a device ID that corresponds to a network connection state and the like at timing when the user inputs an user ID to information processing device 30, or a device ID fixedly preset in information processing device 30. Moreover, the list of the device IDs may be received from server 20 and the like via communication network 40, or may be input through a recording medium such as a CD-ROM, and a method for obtaining the list of the device IDs is arbitrary. Moreover, in registered device list 701, product numbers of the devices or nicknames of the devices, which are managed in server 20 in association with the device IDs, may be included in place of the device IDs.

In program list 702, there are listed broadcast starting times 703 and program names 704 of broadcast programs recorded in receiving device 10 with a device ID "123400" selected in registered device list 701. Then, recorded program reproduction buttons 705 are added to respective recorded programs. Recorded program reproduction buttons 705 may not be added to recorded programs which cannot be reproduced.

Each of recorded program reproduction buttons 705 is a button for instructing receiving device 10 to transmit the selected recorded program.

P2P connection state display 706 is a mark that indicates whether or not the P2P connection is established between information processing device 30 and receiving device 10. In a case where the P2P connection between information processing device 30 and receiving device 10 is not established, P2P connection execution button 707 is pressed, whereby processing for establishing the P2P connection is executed.

Note that the P2P connection between information processing device 30 and receiving device 10 may be established in such a manner that information processing device 30 and receiving device 10 communicate directly with each other via communication network 40, or may be established in such a manner that server 20 mediates therebetween, and means for establishment of the connection is arbitrary.

[1-1-2. Configuration of Information Processing Device]

Figure 4:
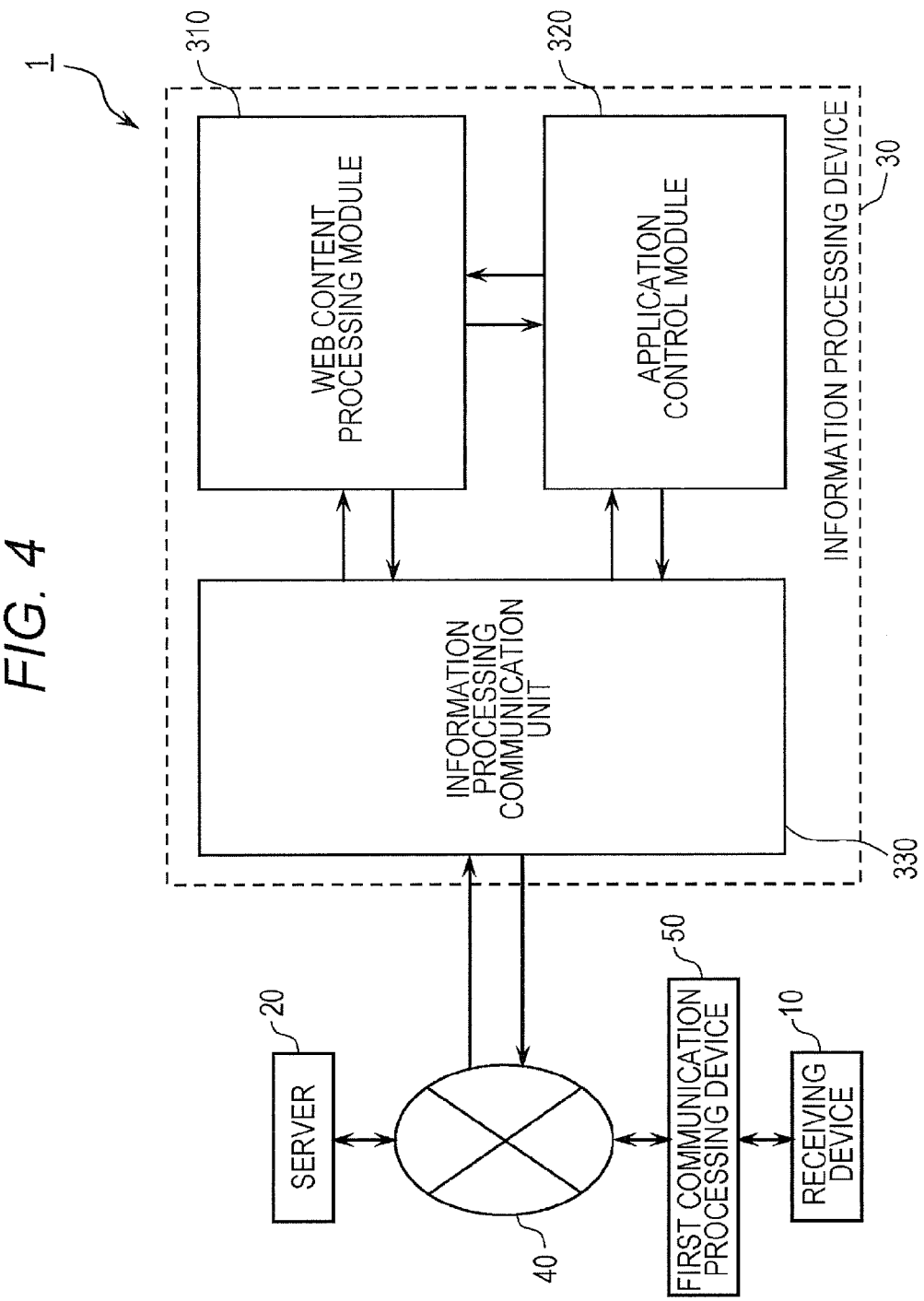
FIG. 4 is a block diagram showing an example of a configuration of the information processing device according to the exemplary embodiment.

FIG. 4 is a block diagram showing an example of a configuration of information processing device 30. In FIG. 4, information processing device 30 includes: WEB content processing module 310; application control module 320; and information processing communication unit 330.

WEB content processing module 310 performs the communication with server 20 via information processing communication unit 330, and processes and displays HTML (Hyper Text Markup Language) content received from server 20. Then, WEB content processing module 310 transmits operation content of the user for the displayed HTML content to application control module 320. Specifically, for example, WEB content processing module 310 performs an inter-socket communication with application control module 320. Moreover, for example, WEB content processing module 310 may treat application control module 320 as a library, and may communicate with application control module 320 by directly calling out a function included in the library.

Moreover, WEB content processing module 310 receives a processing result of application control module 320. Specifically, for example, application control module 320 calls a callback function of a Java (registered trademark) script of WEB content processing module 310, and thereby transmits the processing result to WEB content processing module 310. Moreover, for example, application control module 320 may transmit the processing result to WEB content processing module 310 by the inter-socket communication. Furthermore, for example, application control module 320 may treat WEB content processing module 310 as a library, and may transmit the processing result to WEB content processing module 310 by directly calling out a function included in the library.

Through the P2P connection, application control module 320 performs the communication with receiving device 10 via information processing communication unit 330, and thereby receives the content item from receiving device 10. Moreover, application control module 320 reproduces the received content item.

Moreover, application control module 320 can perform the communication with WEB content processing module 310. A communication method is the same as the method mentioned above, and accordingly, a description thereof is omitted.

Note that information processing device 30 communicates with server 20 or receiving device 10 via information processing communication unit 330. Information processing communication unit 330 is an interface for connecting to communication network 40, and for example, is a modem, an interface card, and a wired/wireless LAN (Local Area Network) module. In this exemplary embodiment, information processing communication unit 330 communicates with server 20 through the client-server connection, and communicates with receiving device 10 through the P2P connection.

Figure 5:
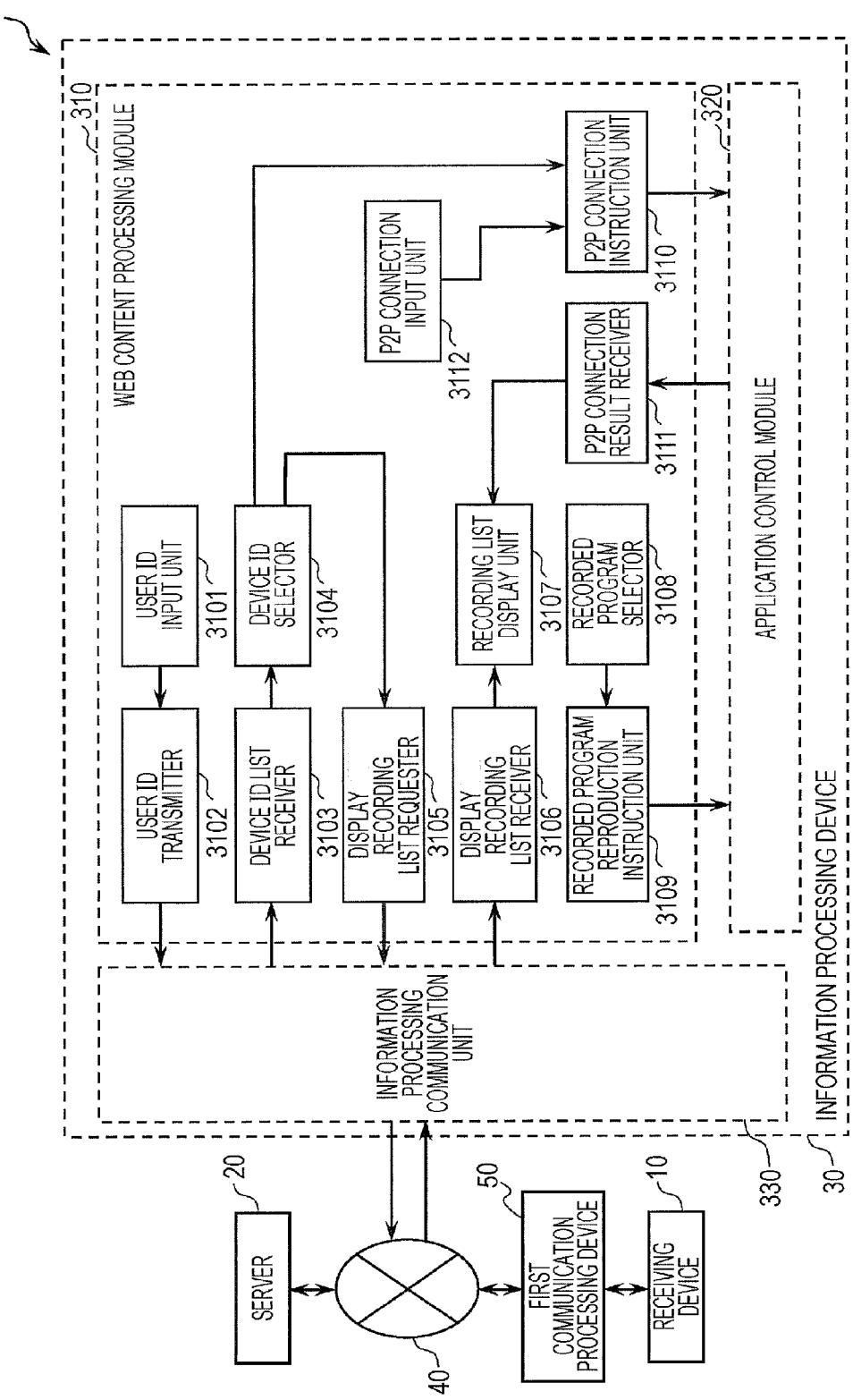
FIG. 5 is a block diagram showing an example of an internal configuration of a WEB content processing module included in the information processing device according to the exemplary embodiment.

FIG. 5 is a block diagram showing an example of a configuration of WEB content processing module 310 of information processing device 30. In FIG. 5, WEB content processing module 310 includes: user ID input unit 3101;

user ID transmitter 3102; device ID list receiver 3103; device ID selector 3104; display recording list requester 3105; display recording list receiver 3106; recording list display unit 3107; recorded program selector 3108; recorded program reproduction instruction unit 3109; P2P connection instruction unit 3110; P2P connection result receiver 3111; and P2P connection input unit 3112.

In order to receive a device ID list, which is registered by the user, in device ID list receiver 3103, user ID input unit 3101 accepts, from the user, an input of the user ID for making a request for the device ID list to server 20. Then, user ID input unit 3101 outputs the user ID, which is input by the user, to user ID transmitter 3102. Note that user ID input unit 3101 may accept an input of a password in addition to the user ID, and may output the user ID and the password together to user ID transmitter 3102.

User ID transmitter 3102 transmits the user ID, which is input from user ID input unit 3101, to server 20 through communication network 40. Note that, in a case where the password is acquired in addition to the user ID from user ID input unit 3101, user ID transmitter 3102 may transmit the user ID and the password together to server 20.

Device ID list receiver 3103 receives the device ID list transmitted from server 20 through communication network 40. The device ID list is a list which includes device IDs of one or more receiving devices registered in association with the user IDs transmitted from user ID transmitter 3102. Note that, in a case where the device IDs are not associated with the user IDs, the device IDs may not be included in the device ID list. Moreover, the device IDs may not be the device IDs themselves recorded in the receiving devices, and each of the device IDs may by any ID as long as the ID can uniquely specify the receiving device.

Device ID selector 3104 selects one device ID from the device ID list input from device ID list receiver 3103. Then, device ID selector 3104 outputs the selected device ID to display recording list requester 3105. In a case where two or more device IDs are included in the device ID list, device ID selector 3104 may select one device ID through the user interface such as registered device list 701 illustrated in FIG. 3, or may automatically select one device ID set as a default. Moreover, device ID selector 3104 issues an instruction on the P2P connection to P2P connection instruction unit 3110 in order to establish the P2P connection between information processing device 30 and receiving device 10.

Based on the device ID input from device ID selector 3104, display recording list requester 3105 transmits a display recording list request signal, which requests a recording list as a list of one or more recorded programs (that is, content items) recorded in receiving device 10, via information processing communication unit 330 through communication network 40 to server 20. The display recording list request signal includes the device ID input from device ID selector 3104.

Display recording list receiver 3106 is an example of a display information receiver. Display recording list receiver 3106 receives display recording list information, which serves for displaying the recording list on at least the user interface, from server 20 through the client-server connection. This display recording list information is an example of display information. That is, display recording list receiver 3106 receives the display information, which serves for displaying the content list as a list of the one or more content items stored in receiving device 10, from server 20 through the first connection that is based on the first communication mode. The received display recording list information is output to recording list display unit 3107.

Recording list display unit 3107 displays all or a part of the display recording list information input from display recording list receiver 3106.

Recorded program selector 3108 is an example of a content selector. In accordance with the operation of the user, recorded program selector 3108 selects at least one recorded program shown in the display recording list information displayed on recording list display unit 3107. That is, based on the display information, recorded program selector 3108 selects at least one content item out of the one or more content items stored in receiving device 10. Then, recorded program selector 3108 outputs a recording identification ID, which identifies the selected recorded program, to recorded program reproduction instruction unit 3109.

Note that a selection method of the recorded program is not limited to a specific method. For example, the recorded program may be selected in such a manner that the user pushes recorded program reproduction button 705 illustrated in FIG. 3. Moreover, for example, a recorded program with the earliest broadcast time may be automatically selected. Furthermore, for example, a recorded program including a keyword preset by the user may be automatically selected. Moreover, for example, a recorded program designated from other application of information processing device 30 may be selected. Furthermore, for example, a recorded program recommended by information processing device 30 may be automatically selected.

Moreover, the recording identification ID may be any ID as long as the ID is information by which receiving device 10 can identify the recorded program. For example, the recording identification ID may be an event ID imparted to each of the programs by a broadcast station. Furthermore, for example, the recording identification ID may be a combination of a broadcast station name or an ID capable of identifying the broadcast station and a program broadcast time. Moreover, for example, the recording identification ID may be an ID imparted to each of the recorded programs by receiving device 10. Furthermore, for example, the recording identification ID may be an ID determined by server 20 and information processing device 30 in accordance with a specific rule. Moreover, for example, the recording identification ID may be a content ID which is arbitrarily determined for each of the recorded programs by receiving device 10.

Recorded program reproduction instruction unit 3109 transmits the recording identification ID, which is input from recorded program selector 3108, as a recorded program reproduction instruction signal to recorded program reproduction instruction receiver 3201 (FIG. 6) included in application control module 320.

Based on a P2P connection instruction from device ID selector 3104, P2P connection instruction unit 3110 transmits a P2P connection instruction signal to P2P connection instruction receiver 3205 (FIG. 6) of application control module 320. Note that receiving device 10 may determine whether or not the P2P connection to the device selected by device ID selector 3104 is already established. In this case, only when it is determined that the P2P connection is not still established (that is, the P2P connection is disconnected), P2P connection instruction unit 3110 may transmit the P2P connection instruction signal to P2P connection instruction receiver 3205 included in application control module 320.

Moreover, the P2P connection instruction is sometimes performed by P2P connection input unit 3112. This is a case where P2P connection execution button 707 of FIG. 3 is pushed by the user operation. Note that, at the time of sensing the disconnection of the P2P connection, information processing device 30 may automatically perform the P2P connection instruction.

P2P connection result receiver 3111 transmits P2P connection result information, which is received from P2P connection result transmitter 3207 included in application control module 320, to recording list display unit 3107. P2P connection result information is, for example, "P2P connection failure", "under P2P connection", "P2P connection success", and the like. At the time of "P2P connection failure", the P2P connection result information may include an error code. In this manner, recording list display unit 3107 can display a state such as "P2P disconnection" and "under P2P connection" on P2P connection state display 706 of the user interface of FIG. 3.

Figure 6:
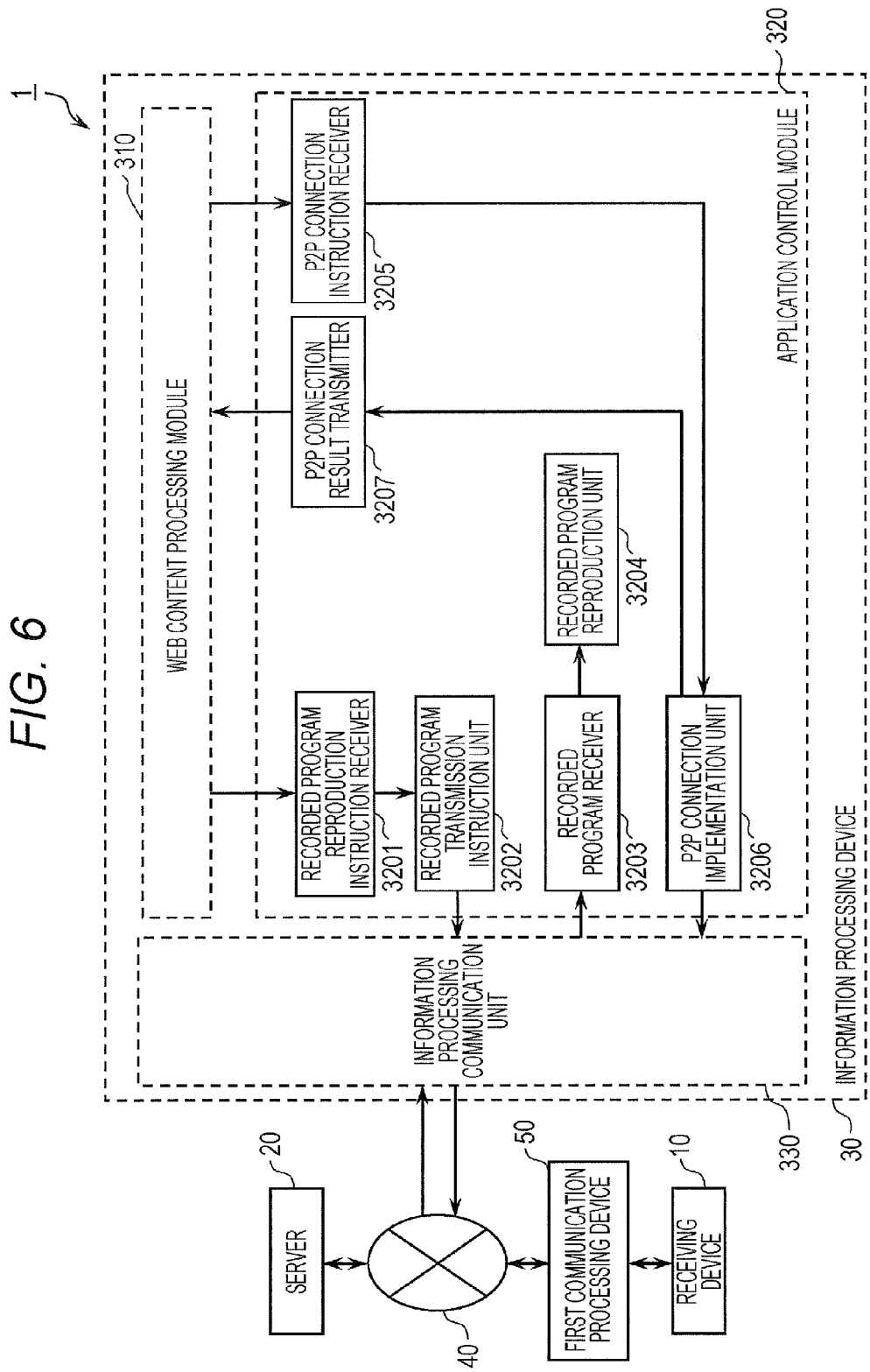
FIG. 6 is a block diagram showing an example of an internal configuration of an application control module included in the information processing device according to the exemplary embodiment.

FIG. 6 is a block diagram showing an example of a configuration of application control module 320 of information processing device 30. In FIG. 6, application control module 320 includes: recorded program reproduction instruction receiver 3201; recorded program transmission instruction unit 3202; recorded program receiver 3203; recorded program reproduction unit 3204; P2P connection instruction receiver 3205; P2P connection implementation unit 3206; and P2P connection result transmitter 3207.

Recorded program reproduction instruction receiver 3201 receives the recorded program reproduction instruction signal from recorded program reproduction instruction unit 3109 included in WEB content processing module 310, and instructs recorded program transmission instruction unit 3202 to reproduce the recorded program.

Based on the instruction from recorded program reproduction instruction receiver 3201, recorded program transmission instruction unit 3202 transmits a recorded program transmission instruction signal, which includes at least the recording identification ID, via information processing communication unit 330 to receiving device 10 through communication network 40. At this time, the recorded program transmission instruction signal is transmitted through the P2P connection. Note that, in a case where the P2P connection is not established between information processing device 30 and receiving device 10, a warning indicating the P2P disconnection may be displayed on the user interface of FIG. 3, or a notice for prompting the user to establish the P2P connection may be issued, or processing for establishing the P2P connection may be automatically performed.

Recorded program receiver 3203 is an example of a content receiver. Recorded program receiver 3203 receives the recorded program (content item) from receiving device 10, and instructs recorded program reproduction unit 3204 to reproduce the recorded program. That is, recorded program receiver 3203 receives the recorded program, which is selected by recorded program selector 3108, from receiving device 10 through the P2P connection established by P2P connection implementation unit 3206 to be described later.

Recorded program reproduction unit 3204 reproduces the recorded program received from recorded program receiver 3203. Recorded program reproduction unit 3204 may close the user interface of FIG. 3 and reproduce the recorded program on the full screen, or may reproduce the recorded program on a partial region of the user interface.

P2P connection instruction receiver 3205 receives the P2P connection instruction signal transmitted from P2P connection instruction unit 3110 included in WEB content processing module 310, and makes a request to P2P connection implementation unit 3206 to establish the P2P connection.

P2P connection implementation unit 3206 is an example of a communication establishment unit. Based on a request from P2P connection instruction receiver 3205, P2P connection implementation unit 3206 transmits a P2P connection request signal to receiving device 10 via information processing communication unit 330 through communication network 40, and establishes the P2P connection between receiving device 10 and information processing device 30. That is, P2P connection implementation unit 3206 establishes the P2P connection between receiving device 10 and information processing device 30.

In a case where the P2P connection is already established between information processing device 30 and receiving device 10, P2P connection implementation unit 3206 may transmit a response, which indicates "P2P connection success" and "under P2P connection", to P2P connection result transmitter 3207 without transmitting the P2P connection request signal to receiving device 10. Note that the P2P connection request signal may be transmitted from information processing device 30 via server 20 to receiving device 10, and a route of the transmission is arbitrary. Moreover, the P2P connection result is transmitted from P2P connection implementation unit 3206 to P2P connection result transmitter 3207.

P2P connection result transmitter 3207 transmits the P2P connection result information, which is based on the P2P connection result received from P2P connection implementation unit 3206, to P2P connection result receiver 3111 included in WEB content processing module 310.

[1-1-3. Configuration of Server]

Figure 7:
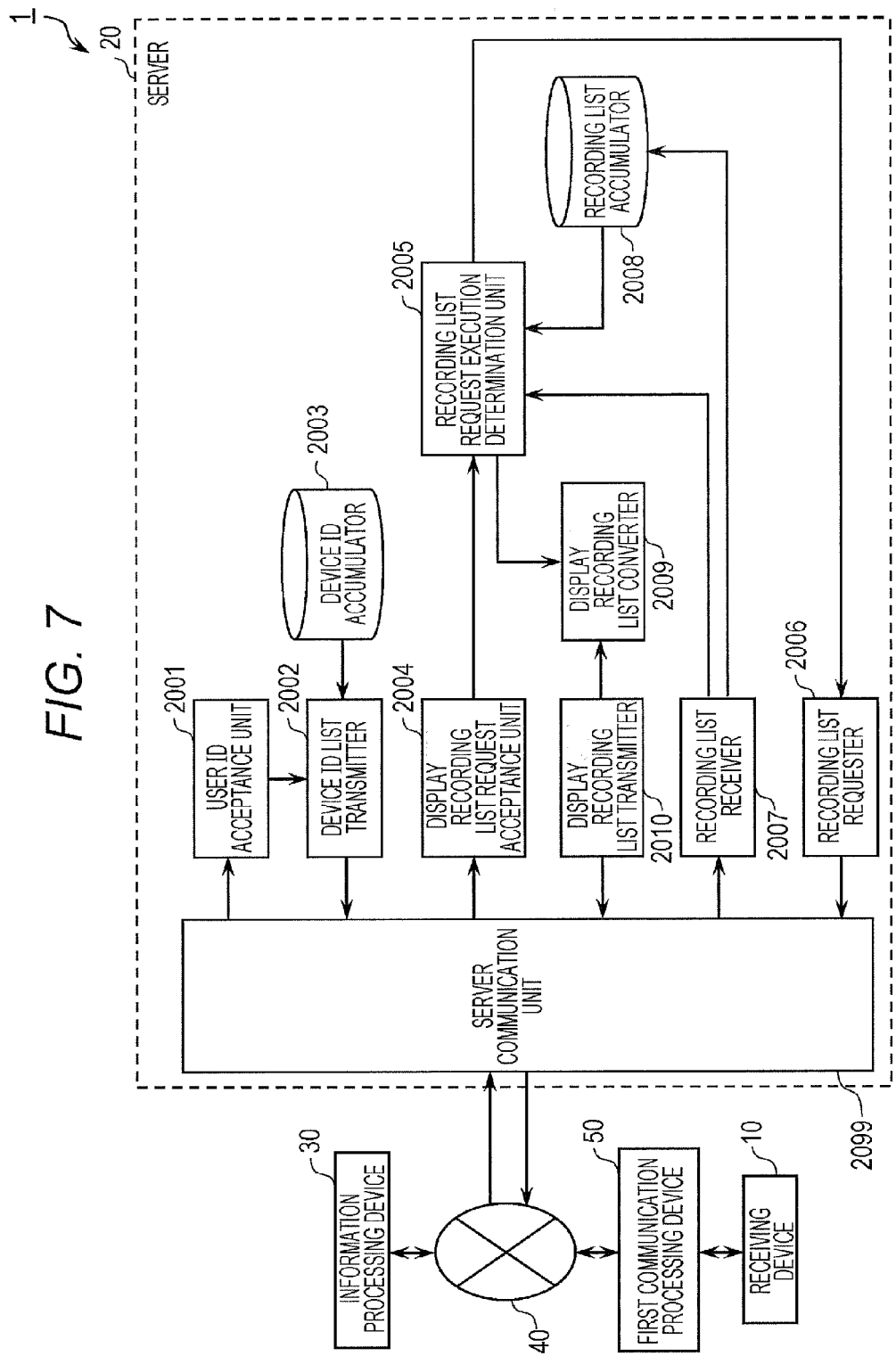
FIG. 7 is a block diagram showing an example of a configuration of a server according to the exemplary embodiment.

FIG. 7 is a block diagram showing an example of a configuration of server 20. In FIG. 7, server 20 includes: user ID acceptance unit 2001; device ID list transmitter 2002; device ID accumulator 2003; display recording list request acceptance unit 2004; recording list request execution determination unit 2005; recording list requester 2006; recording list receiver 2007; recording list accumulator 2008; display recording list converter 2009; display recording list transmitter 2010; and server communication unit 2099.

User ID acceptance unit 2001 receives the user ID transmitted from information processing device 30 through communication network 40. Then, user ID acceptance unit 2001 confirms validity of the user ID, and outputs the valid user ID to device ID list transmitter 2002. The confirmation of validity of the user ID is performed by confirmation of a coincidence with the user ID registered in advance and by confirmation using the user ID and a password.

Device ID list transmitter 2002 acquires the device ID list, which is associated with the user ID input from user ID acceptance unit 2001, from device ID accumulator 2003. Then, device ID list transmitter 2002 transmits the acquired device ID list to information processing device 30 through communication network 40.

Device ID accumulator 2003 accumulates the device ID list in association with each of a plurality of the user IDs. Here, the registration of the device ID into the device ID list accumulated in device ID accumulator 2003 may be performed by the user, for example, after the user logs into server 20 from information processing device 30 by using the user ID. Moreover, the device ID may be registered in the device ID list by using registration means for the device ID, which is carried out in a general web service.

Display recording list request acceptance unit 2004 receives the display recording list request signal from information processing device 30 through communication network 40. Then, display recording list request acceptance unit 2004 outputs the device ID and the like, which are included in the display recording list request signal, to recording list request execution determination unit 2005.

Recording list request execution determination unit 2005 confirms whether or not the recording list, which corresponds to the device ID and the like input from display recording list request acceptance unit 2004, is already accumulated in recording list accumulator 2008.

In a case where the recording list, which corresponds to the device ID and the like input from display recording list request acceptance unit 2004, is accumulated, recording list request execution determination unit 2005 acquires this recording list from recording list accumulator 2008, and outputs the recording list to display recording list converter 2009.

Meanwhile, in a case where the recording list, which corresponds to the device ID and the like input from display recording list request acceptance unit 2004, is not accumulated, recording list request execution determination unit 2005 outputs a recording list request, which includes the device ID and the like, to recording list requester 2006. Then, recording list requester 2006 transmits the recording list request signal to the device corresponding to the device ID. Thereafter, when a recording list acquisition completion notice, which indicates that the recording list is acquired, is input in recording list receiver 2007, recording list requester 2006 acquires the recording list, which corresponds to the device ID and the like input from display recording list request acceptance unit 2004, from recording list accumulator 2008, and outputs the acquired recording list to display recording list converter 2009.

Note that, in a case where a predetermined time has elapsed since the recording list is accumulated, recording list request execution determination unit 2005 may output a recording list request, which requests only a difference from a previously acquired recording list (that is, the recording list accumulated in recording list accumulator 2008), to recording list requester 2006, or may output a recording list request, which is to acquire the whole recording list one more time, to recording list requester 2006.

Recording list requester 2006 transmits the recording list request signal to receiving device 10 through communication network 40 in order to acquire the recording list corresponding to the device ID included in the recording list request input from recording list request execution determination unit 2005. Note that recording list requester 2006 may make the recording list request once, or may make the recording list request a number of times necessary for each predetermined number of recording. Moreover, recording list requester 2006 may make the recording list request a number of times necessary for each day divided by the broadcast time.

Furthermore, recording list requester 2006 may request a recording list of all of the broadcast stations and all of broadcast time bands. Moreover, recording list requester 2006 may request a recording list of only broadcast time bands of that day. Furthermore, recording list requester 2006 may request a recording list that includes only a recorded program broadcast by a broadcast station and at a broadcast time, which are determined based on information preset by a setting file or the like in server 20.

Recording list receiver 2007 is an example of a content list receiver that receives a content list from receiving device 10. Specifically, recording list receiver 2007 receives the recording list from receiving device 10, which corresponds to the input device ID, through communication network 40. Then, recording list receiver 2007 accumulates the recording list in recording list accumulator 2008, and outputs the recording list acquisition completion notice, which indicates that the recording list has been acquired, to recording list request execution determination unit 2005.

The recording list includes: the broadcast station name; the broadcast starting time; a broadcast ending time; a program name; and an event ID for identifying the program. The recording list may include information other than these pieces of the information. Note that, in a case where recording list requester 2006 makes a recording list acquisition request a plurality of times, recording list receiver 2007 may output the recording list acquisition completion notice to recording list request execution determination unit 2005 at a point of time when all of the recording lists have been received.

Here, with reference to FIG. 9, a description is made of an example of data accumulated in recording list accumulator 2008. In recording list accumulator 2008, the recording list is accumulated in a table format. The recording list may include: "device ID" column 91; "channel (ch)" column 92; "recording starting date and time" column 93; "recording ending date and time" column 94; "program name" column 95; "content ID" column 96; and "update date and time" column 97. Note that the recording list may include the broadcast station name in place of the channel, or may include both of the channel and the broadcast station name. Moreover, information on a service that is not used may not be included.

The broadcast station name may be a character string indicating the name of the broadcast station, or may be an ID capable of uniquely identifying the broadcast station. Moreover, the recording ending date and time may be the recording time. Furthermore, the content ID may be an event ID imparted to each of the programs by the broadcast station, a combination of the broadcast station name or the ID capable of identifying the broadcast station and the program broadcast time, an ID determined by server 20 and information processing device 30 in accordance with a common rule, or an ID determined arbitrarily by receiving device 10. That is, the content ID only needs to be information capable of identifying the program.

Note that server 20 may not include recording list request execution determination unit 2005 and recording list accumulator 2008. In this case, display recording list request acceptance unit 2004 directly outputs a recording list acquisition request signal for requesting the acquisition of the recording list to recording list requester 2006. Then, recording list receiver 2007 directly outputs the received recording list to display recording list converter 2009.

Display recording list converter 2009 is an example of a display information converter that converts the content list into display information. In a case where the recording list is input from recording list request execution determination unit 2005, display recording list converter 2009 converts the input recording list into display information with a format capable of being displayed by information processing device 30, and outputs the display information as a display recording list to display recording list transmitter 2010.

The display information may be information for a browser. In this case, the display information may include information for controlling an expression format of the recording list. The information for controlling the expression format is represented, for example, by HTML•Java (registered trademark) Script, CSS (Cascading Style Sheets) and the like.

Moreover, for example, the display information may be information for an application. In this case, the display information is represented, for example, by SOAP (Simple Object Access Protocol), XML (Extensible Markup Language) and the like.

Display recording list transmitter 2010 transmits a display recording list, which is input from display recording list converter 2009, to information processing device 30 via server communication unit 2099 through communication network 40.

Server communication unit 2099 is an interface for connecting to communication network 40, and for example, is a modem, an interface card, or a wired/wireless LAN module. For example, server communication unit 2099 communicates with information processing device 30 through the client-server connection.

[1-1-4. Configuration of Receiving Device]

Figure 8:
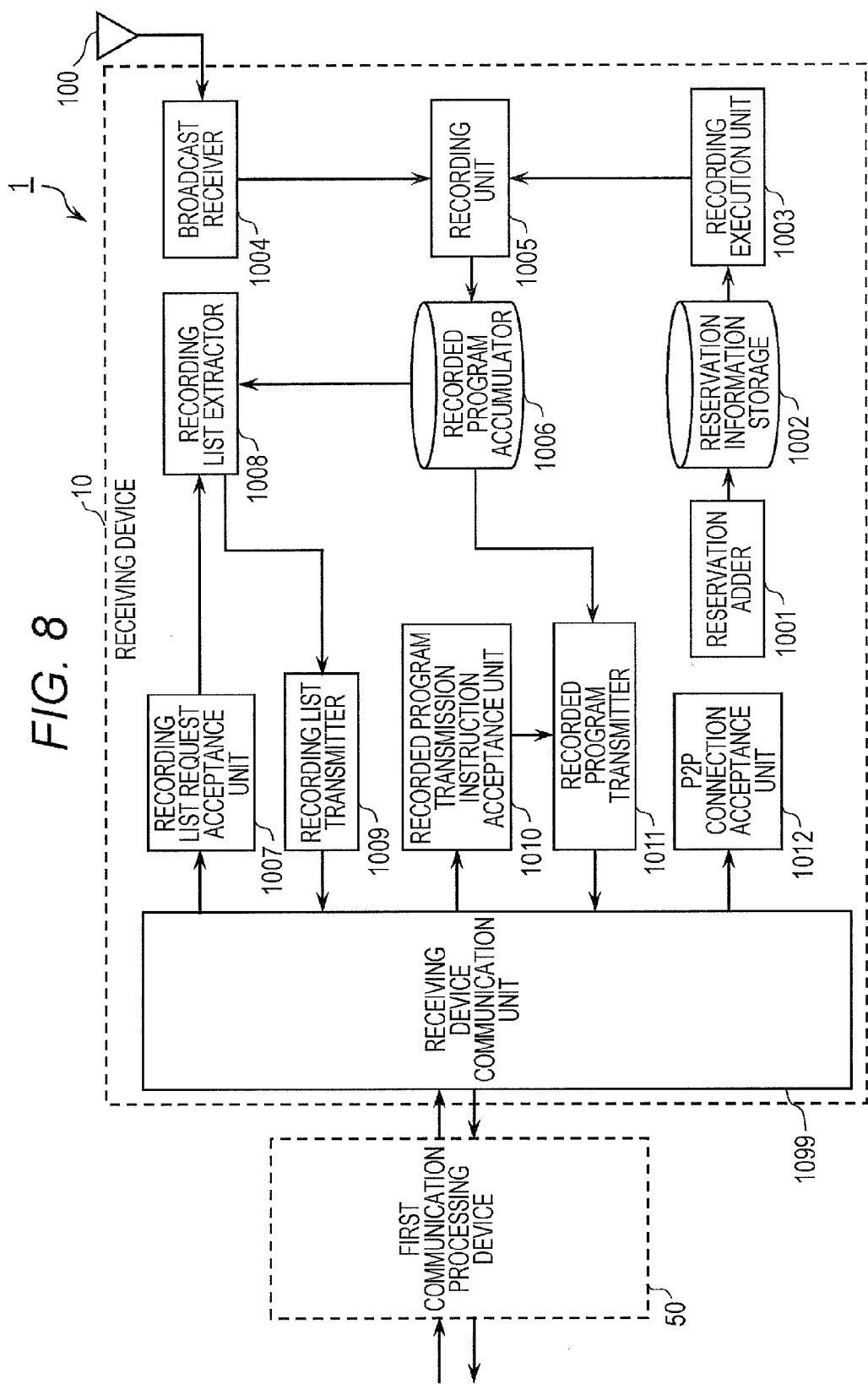
FIG. 8 is a block diagram showing an example of a configuration of a receiving device according to the exemplary embodiment.

FIG. 8 is a block diagram showing an example of a configuration of receiving device 10. In FIG. 8, receiving device 10 includes: reservation adder 1001; reservation information storage 1002; recording execution unit 1003; broadcast receiver 1004; recording unit 1005; recorded program accumulator 1006; recording list request acceptance unit 1007; recording list extractor 1008; recording list transmitter 1009; recorded program transmission instruction acceptance unit 1010; recorded program transmitter 1011; and P2P connection acceptance unit 1012.

Based on an operation of the user, reservation adder 1001 registers data (hereinafter, referred to as a program reservation) for making a reservation to record the program. The program reservation is accumulated in reservation information storage 1002. Note that the program reservation may be automatically registered based on the recommended program selected by receiving device 10, or may be registered based on recommendation information distributed from the broadcast station.

Reservation information storage 1002 stores the program reservation registered by reservation adder 1001.

Recording execution unit 1003 monitors a starting time of the program reservation, which is stored in reservation information storage 1002, and thereby transmits an instruction to start the recording to recording unit 1005 at the starting time.

Broadcast receiver 1004 is a tuner for receiving a broadcast wave, which is received by antenna 100, by receiving device 10. Broadcast receiver 1004 receives the broadcast wave, and outputs the received broadcast wave to recording unit 1005.

In accordance with the instruction to start the recording from recording execution unit 1003, recording unit 1005 records the program from the broadcast wave received by broadcast receiver 1004.

Recorded program accumulator 1006 accumulates the program recorded by recording unit 1005.

Through communication network 40 and first communication processing device 50, recording list request acceptance unit 1007 receives the recording list request signal from server 20 via receiving device communication unit 1099, and makes a request for the recording list to recording list extractor 1008.

In accordance with the request for the recording list from recording list request acceptance unit 1007, recording list extractor 1008 extracts the recorded program accumulated in recorded program accumulator 1006, and thereby creates the recording list. The recording list includes: "device ID"; "channel (ch)"; "recording starting date and time"; "recording ending date and time"; "program name"; "content ID"; and "update date and time". Note that the recording list may include the broadcast station name in place of the channel, or may include both of the channel and the broadcast station name.

Moreover, information on a not-used service may not be included. The broadcast station name may be a character string indicating the name of the broadcast station, or may be an ID capable of uniquely identifying the broadcast station. Moreover, the recording ending date and time may be the recording time. Furthermore, the content ID may be an event ID imparted to each of the programs by the broadcast station, a combination of the broadcast station name or the ID capable of identifying the broadcast station and the program broadcast time, an ID determined by server 20 and information processing device 30 in accordance with a common rule, or an ID determined arbitrarily by receiving device 10. That is, the content ID only needs to be information capable of identifying the program.

Recording list transmitter 1009 transmits the recording list, which is created by recording list extractor 1008, to server 20 via receiving device communication unit 1099 through first communication processing device 50 and communication network 40. Note that, at the time of transmitting the recording list to server 20, recording list transmitter 1009 may convert the recording list into a format determined between receiving device 10 and server 20. As the format determined between receiving device 10 and server 20, for example, CSV (Comma Separated Values), SOAP, XML, JSON (JavaScript (registered trademark) Object Notation) and the like are used.

Recorded program transmission instruction acceptance unit 1010 receives the recorded program transmission instruction signal from information processing device 30 through communication network 40 and first communication processing device 50 via receiving device communication unit 1099. Then, recorded program transmission instruction acceptance unit 1010 instructs recorded program transmitter 1011 to transmit the recorded program corresponding to the recording identification ID included in the recorded program transmission instruction signal.

Recorded program transmitter 1011 acquires from recorded program accumulator 1006 the recorded program, which corresponds to the recording identification ID transmitted from recorded program transmission instruction acceptance unit 1010, and transmits the acquired recorded program to information processing device 30 via receiving device communication unit 1099 through first communication processing device 50 and communication network 40. The recorded program is transmitted to information processing device 30 by the communication made by the P2P connection.

P2P connection acceptance unit 1012 receives the P2P connection request signal from information processing device 30 through communication network 40 and first communication processing device 50 via receiving device communication unit 1099. Then, P2P connection acceptance unit 1012 establishes the P2P connection between receiving device 10 and information processing device 30.

Receiving device communication unit 1099 is an interface for connecting to first communication processing device 50, and for example, is a modem, an interface card, or a wired/wireless LAN module.

[1-2. Operations]

With regard to communication system 1 configured as described above, an example of operations of communication system 1 is described with reference to FIG. 10 to FIG. 13. FIG. 10 to FIG. 13 describe processing in which the user logs in, information processing device 30 and receiving device 10 perform the P2P connection, and the user selects the recorded program from the recording list, and reproduces the recorded program.

[1-2-1. Recording List Display/P2P Connection Processing]

Figure 10:
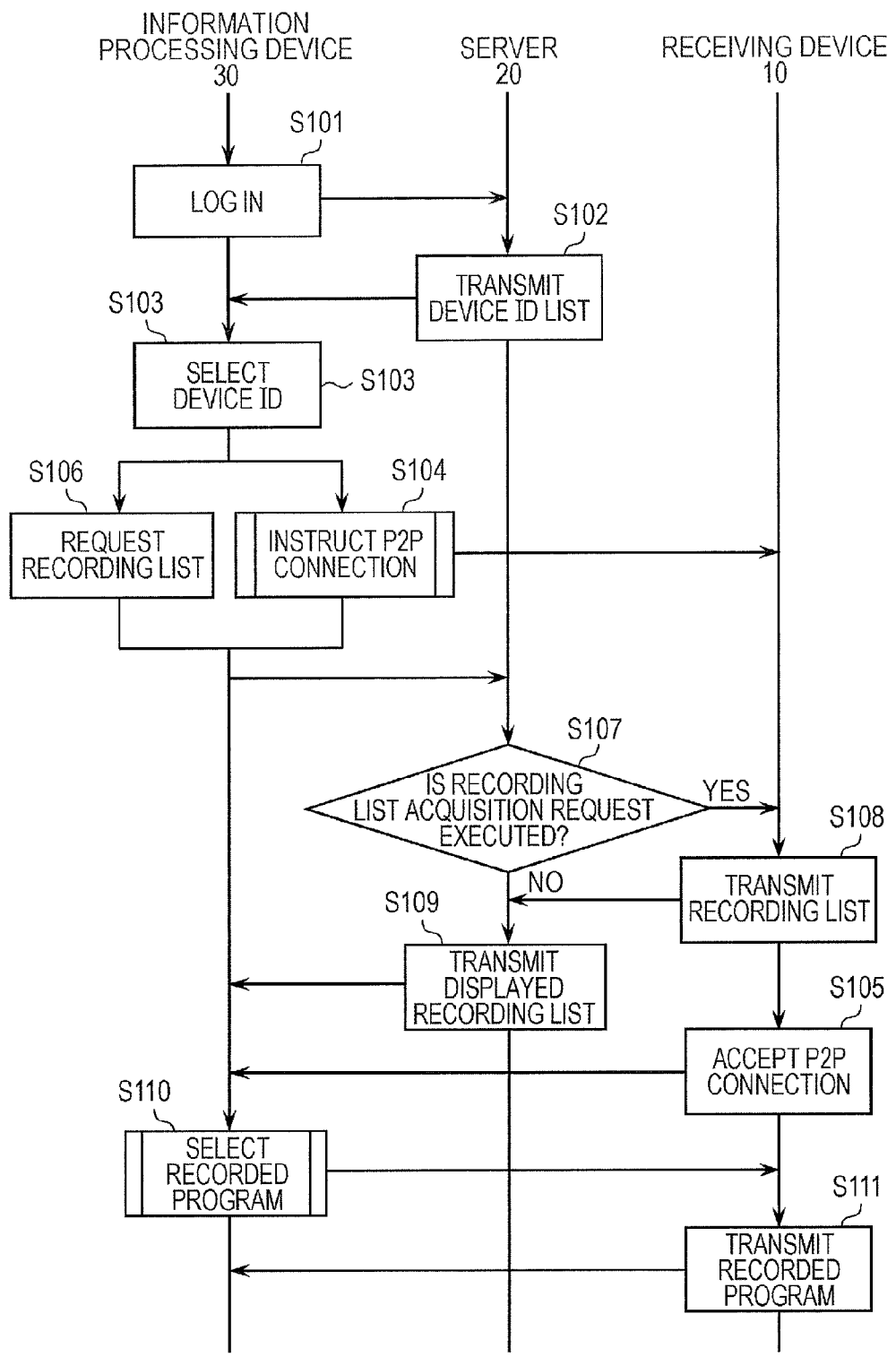
FIG. 10 is a diagram showing an example of a flowchart of processing for displaying a recording list on the information processing device in the exemplary embodiment.

With reference to FIG. 10, a description is made of processing until the recording list is displayed on information processing device 30 in communication system 1 and the reproduction of the recorded program is executed. Step S104 of FIG. 10 refers to P2P connection instruction processing in FIG. 11, and Step S110 of FIG. 10 refers to selection processing for the recorded program in FIG. 13. Moreover, Step S202 in FIG. 11 refers to P2P connection processing in FIG. 12.

First, in Step S101, information processing device 30 transmits the user ID, which is input by user ID input unit 3101, to server 20 via user ID transmitter 3102.

In Step S102, server 20 executes login processing based on the user ID received by user ID acceptance unit 2001. Then, server 20 transmits a device ID list, which is associated with the user ID subjected to the login processing, to information processing device 30 via device ID list transmitter 2002.

In Step S103, device ID selector 3104 of information processing device 30 selects the device ID from the device ID list.

Next, in Step S104, information processing device 30 performs the P2P connection processing, and thereby establishes the P2P connection with receiving device 10 identified by the selected device ID. Detailed contents of the P2P connection instruction processing will be described later with reference to FIG. 11. Information processing device 30 executes Step S106 to Step S109, which will be described later, before the P2P connection processing in Step S105 is completed.

In Step S105, by P2P connection acceptance unit 1012, receiving device 10 accepts the request for the P2P connection from information processing device 30.

In Step S106, information processing device 30 transmits, to server 20, the display recording list request signal for acquiring the display recording list information corresponding to the device ID selected in Step S103 by display recording list requester 3105.

In Step S107, recording list request execution determination unit 2005 of server 20 determines whether or not to acquire the recording list from receiving device 10 based on the device ID included in the display recording list request signal received by display recording list request acceptance unit 2004. In a case where it is necessary to acquire the recording list, server 20 transmits the recording list request signal to receiving device 10 via recording list requester 2006. In a case where it is not necessary to acquire the recording list, server 20 does not transmit the recording list request signal to receiving device 10.

In Step S108, receiving device 10 transmits the recording list of all or a part of the recorded programs, which are stored in receiving device 10, as a response to the recording list request signal in Step S107 to server 20 via recording list transmitter 1009.

In Step S109, server 20 converts the recording list, which is received from receiving device 10, into the display recording list information, and transmits the display recording list information to information processing device 30 via display recording list transmitter 2010.

In Step S110, information processing device 30 displays the display recording list information, which is received from server 20, on recording list display unit 3107.

When the user selects the recorded program from the display recording list information via recorded program selector 3108, recorded program transmission instruction unit 3202 transmits the recorded program transmission instruction signal, which includes the recording identification ID, to receiving device 10 through the P2P connection established in Step S104. Detailed processing content items about the selection and reproduction of the recorded program will be described later with reference to FIG. 13.

In Step S111, receiving device 10 transmits the recorded program, which corresponds to the recording identification ID included in the recorded program transmission instruction signal received by recorded program transmission instruction acceptance unit 1010, via recorded program transmitter 1011 to information processing device 30.

As described above, before the P2P connection between information processing device 30 and receiving device 10 is established by Step S104 and Step S105, information processing device 30 can acquire the display recording list information by Step S106 to Step S109. That is, Step S104 and Step S105 and Step S106 to Step S109 are performed simultaneously, whereby a processing time can be shortened.

Figure 11:
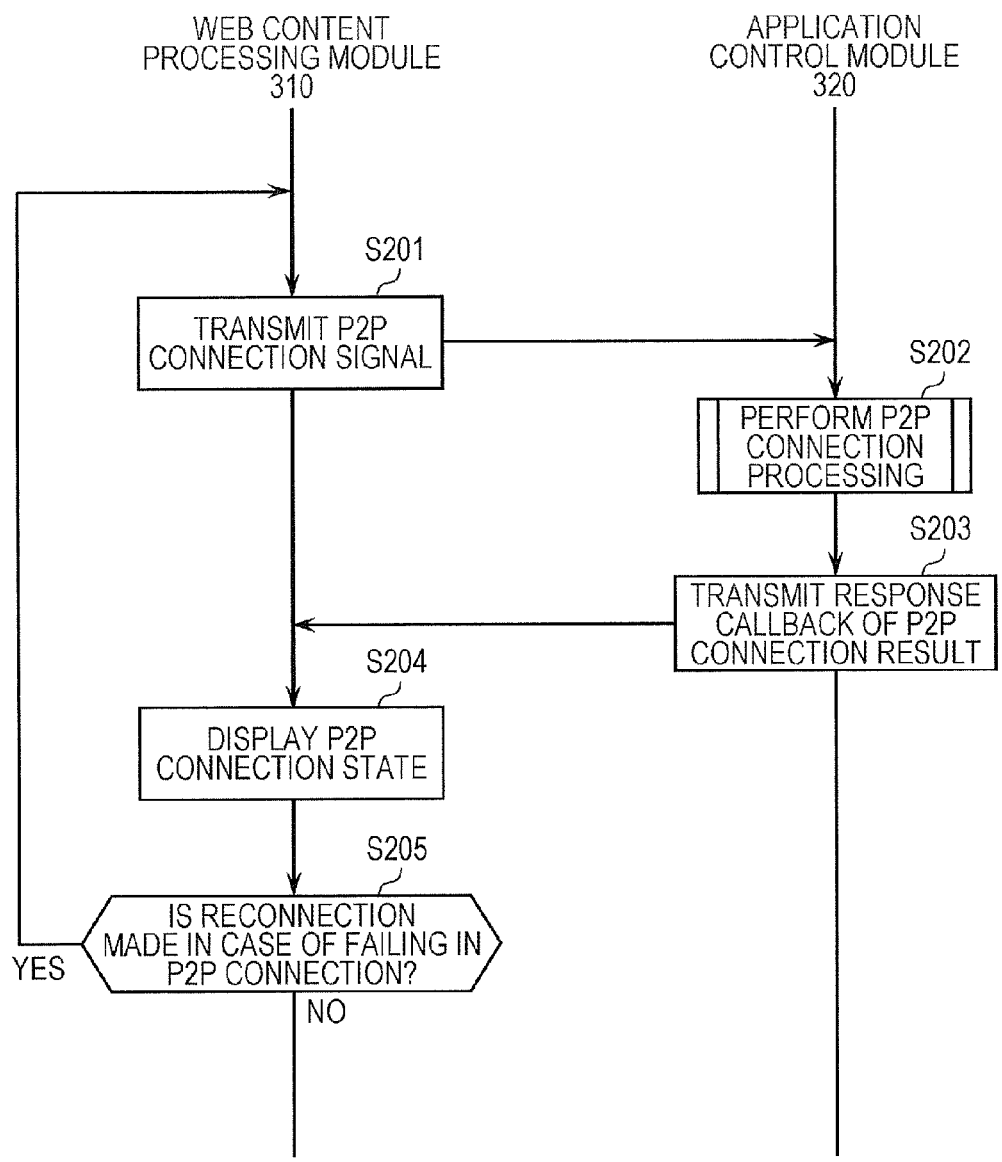
FIG. 11 is a diagram showing an example of a flowchart of P2P connection instruction processing in the exemplary embodiment.

FIG. 11 is a flowchart showing the P2P connection instruction processing of information processing device 30. FIG. 11 shows details of the processing of Step S104 in FIG. 10. Here, a description is mainly made of the communication between WEB content processing module 310 and application control module 320.

In Step S201, P2P connection instruction unit 3110 included in WEB content processing module 310 of information processing device 30 transmits the P2P connection instruction signal to P2P connection instruction receiver 3205 of application control module 320.

In Step S202, P2P connection implementation unit 3206 of application control module 320 receives the P2P connection instruction from P2P connection instruction receiver 3205, and transmits the P2P connection request signal to receiving device 10. Detailed contents of the P2P connection processing will be described later with reference to FIG. 12.

In Step S203, P2P connection result transmitter 3207 of application control module 320 receives the P2P connection result of P2P connection implementation unit 3206, and transmits a response callback of the P2P connection result as the P2P connection result information to P2P connection result receiver 3111 of WEB content processing module 310.

In Step S204, recording list display unit 3107 of the WEB content processing module 310 receives the P2P connection result information, and displays a P2P connection state on the screen.

In Step S205, WEB content processing module 310 determines whether or not reconnection of the P2P connection is necessary in a case of failing in the P2P connection, and performs reconnection processing from Step S201 in a case where the reconnection is necessary. Note that the reconnection may be performed when the recorded program is selected by recorded program selector 3108. Moreover, the reconnection may be automatically performed a predetermined number of times.

Figure 12:
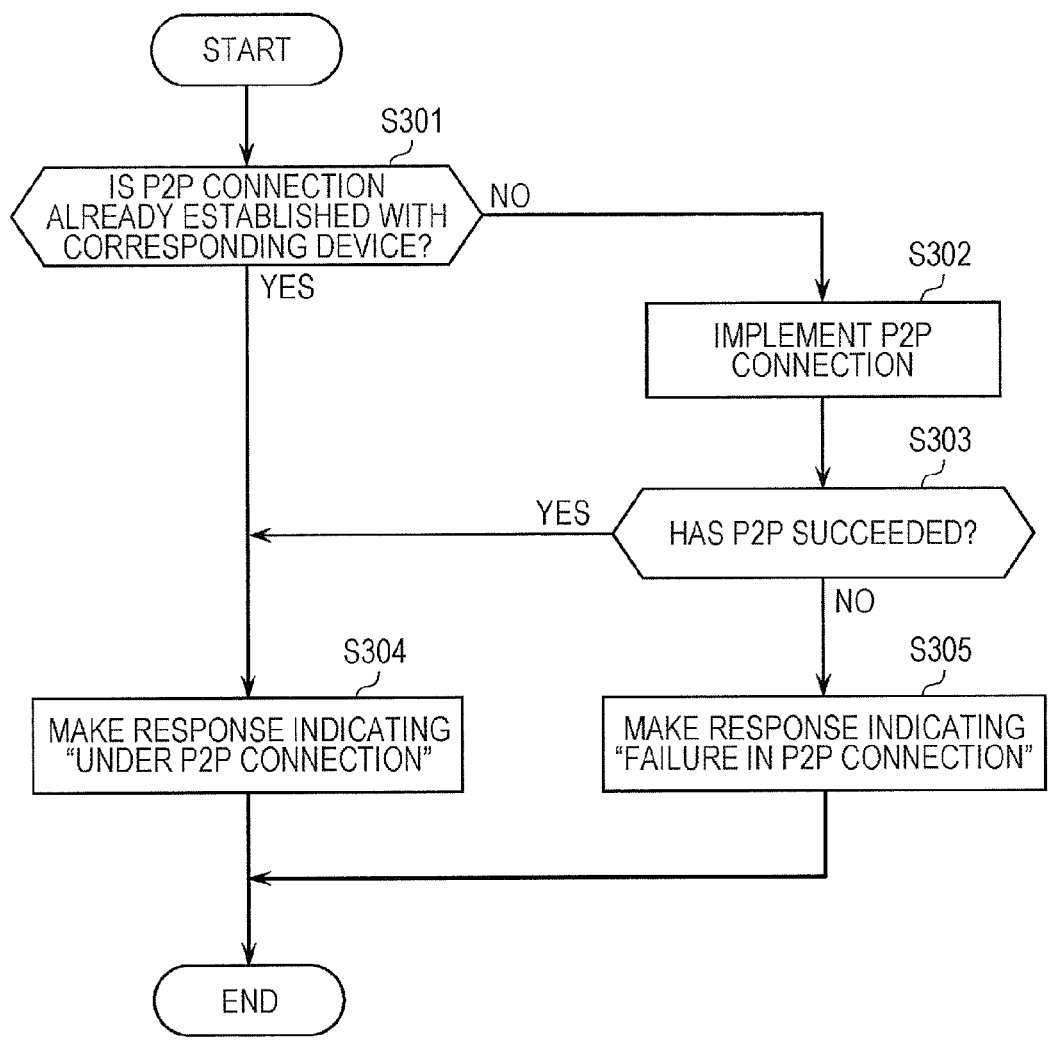
FIG. 12 is a diagram showing an example of a flowchart of P2P connection processing in the exemplary embodiment.

FIG. 12 is a flowchart showing the P2P connection processing in P2P connection implementation unit 3206 of application control module 320. FIG. 12 shows details of the P2P connection processing of FIG. 11.

In Step S301, P2P connection implementation unit 3206 determines whether or not the P2P connection is already established between receiving device 10 and information processing device 30.

In Step S302, in a case where the P2P connection is not established, P2P connection implementation unit 3206 transmits the P2P connection request signal to receiving device 10, and attempts the P2P connection.

In Step S303, P2P connection implementation unit 3206 determines whether or not the P2P connection has succeeded. The determination as to whether or not the P2P connection has succeeded is performed by making the P2P communication with a P2P connection destination (that is, receiving device 10), and by determining whether or not there is a response from receiving device 10.

In Step S304, P2P connection implementation unit 3206 makes a response, which indicates "under P2P connection", to P2P connection result transmitter 3207.

In Step S305, P2P connection implementation unit 3206 makes a response, which indicates "failure in P2P connection", to P2P connection result transmitter 3207.

[1-2-2. Recorded Program Reproduction Processing]

Figure 13:
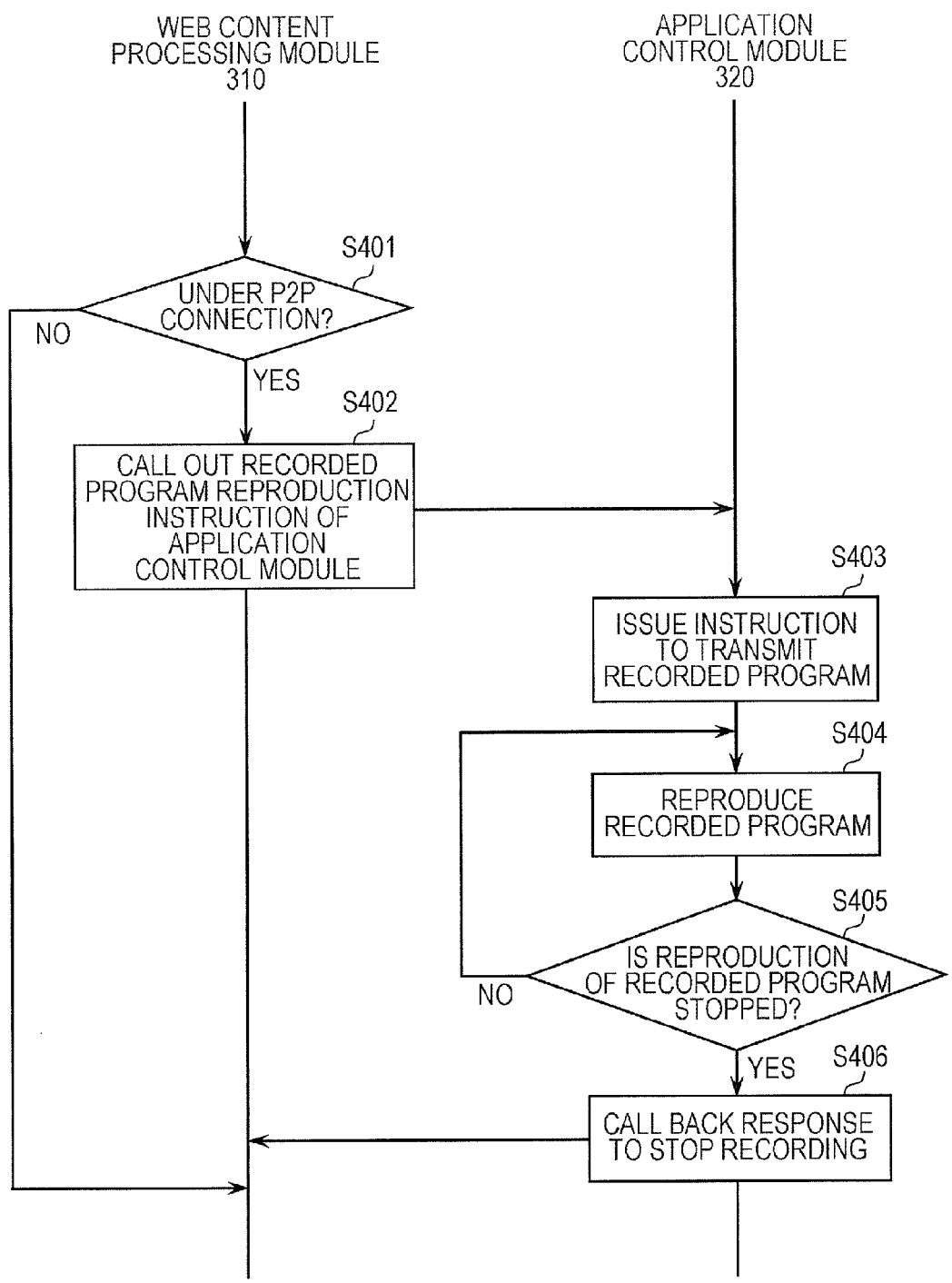
FIG. 13 is a diagram showing an example of a flowchart of processing from selection of a recorded program to reproduction of the recorded program in the exemplary embodiment.

With reference to FIG. 13, a description is made of processing for reproducing the recorded program received through the P2P connection. A description is made in detail of operations of performing processing for selecting the recorded program from the displayed recording list in the communication system in FIG. 10.

In Step S401, recorded program reproduction instruction unit 3109 of WEB content processing module 310 determines whether or not to be under P2P connection with receiving device 10. That is, recorded program reproduction instruction unit 3109 determines whether or not the P2P connection is established between receiving device 10 and information processing device 30. In a case where the P2P connection is not established between receiving device 10 and information processing device 30, the processing shifts to processing for making the P2P connection, and accordingly, this flowchart is ended.

In a case where the P2P connection is established between receiving device 10 and information processing device 30, then in Step S402, recorded program reproduction instruction unit 3109 of WEB content processing module 310 transmits the recorded program reproduction instruction signal, which includes the recording identification ID, to recorded program reproduction instruction receiver 3201 of application control module 320.

In Step S403, recorded program transmission instruction unit 3202 of application control module 320 transmits the recorded program transmission instruction signal to receiving device 10 through the P2P connection, and thereby instructs receiving device 10 to transmit the recorded program.

In Step S404, recorded program receiver 3203 of application control module 320 receives the recorded program from receiving device 10. Recorded program reproduction unit 3204 reproduces the recorded program received from receiving device 10.

In Step S405, it is determined whether or not the reproduction of the recorded program by recorded program reproduction unit 3204 is stopped.

In Step S406, a response to stop the recording is called back to WEB content processing module 310 when the reproduction of the recorded program is stopped. WEB content processing module 310 displays the recording list.

[1-3. Effects and the Like]

As described above, in communication system 1 in this exemplary embodiment, WEB content processing module 310 of information processing device 30 includes: display recording list receiver 3106; and recorded program selector 3108. Moreover, application control module 320 of information processing device 30 includes recorded program receiver 3203 and P2P connection implementation unit 3206.

In accordance with the configuration as described above, the display information is provided from server 20 to information processing device 30 before the P2P connection is established between receiving device 10 and information processing device 30. Hence, before the P2P connection is established, it becomes possible to display the list of the recorded programs and to select the recorded program. That is, the establishment of the P2P connection between receiving device 10 and information processing device 30 and the selection of the content item based on the display information can be performed simultaneously. As a result, at the time of reproducing the recorded program, which is accumulated in receiving device 10, by information processing device 30, a waiting time of the user for establishing the P2P connection can be shortened while reducing the load of server 20 by the P2P connection.

Moreover, in communication system 1 in this exemplary embodiment, server 20 includes recording list receiver 2007 and display recording list converter 2009. Then, the display recording list information as the conversion result in display recording list converter 2009 can include information for controlling the expression format of the recording list.

In accordance with the configuration as described above, the display recording list information is changed in server 20, whereby it becomes possible to change the expression format of the recording list in information processing device 30. That is, even if application software for displaying the recording list is not updated in information processing device 30, the expression format of the recording list can be changed with ease. For example, addition and the like of the information regarding the broadcast program, which is included in the recording list, can be performed with ease, and flexibility of communication system 1 can be enhanced.

Other Exemplary Embodiments

As above, the exemplary embodiment has been described as the exemplification of the technique in this disclosure. For this purpose, the accompanying drawings and the detailed description are provided.

Hence, the constituent elements described in the accompanying drawings and the detailed description may include not only constituent elements which are essential for solving the problem, but also constituent elements which are provided for exemplifying the above-described technique and not essential for solving the problem. Therefore, it should not be immediately recognized that such non-essential constituent elements are essential based on the fact that the non-essential constituent elements are described in the accompanying drawings and the detailed description.

Note that the respective constituent elements in the above-mentioned exemplary embodiment may be configured by dedicated hardware, or alternatively, constituent elements realizable by software may be configured by software by a program control.

Note that, the transmission step of transmitting the information, the reception step of receiving the information, and the like, do not include processing performed by the hardware, for example, processing performed by the modem, the interface card and the like in the transmission step (that is, processing performed by only the hardware).

Moreover, the software by the program control may be distributed by being downloaded from the server and the like, or may be distributed by being recorded in a predetermined recording medium (for example, an optical disc such as a CD-ROM, a magnetic disk, a semiconductor memory and the like).

Moreover, the number of servers that execute the software by the program control may be single, or may be plural. That is, centralized processing may be performed, or distributed processing may be performed.

Moreover, the above-mentioned exemplary embodiment is for exemplifying the technique in this disclosure, and accordingly, can be subjected to varieties of alterations, replacements, additions, omissions and the like within the scope of claims or within the scope of equivalents thereof.

Note that, in the above-mentioned exemplary embodiment, the description has been made of the case where the first connection is the client-server connection, and the second connection is the P2P connection; however, the first connection and the second connection are not limited thereto. For example, the first connection may be an Internet connection, and the second connection may be a Bluetooth (registered trademark) connection. Moreover, for example, the first connection may be a Wi-Fi connection, and the second connection may be a Wi-Fi direct connection.

Moreover, in the above-mentioned exemplary embodiment, the first connection and the second connection are realized via the same communication network 40; however, the first connection and the second connection may be realized by communication networks different from each other.

Moreover, in the above-mentioned exemplary embodiment, the communication system includes the receiving device that records the broadcast program; however, the communication system may not necessarily include the receiving device as described above. For example, the communication system may include a home server, which accumulates video data imaged by using a digital video camera, in place of the receiving device. That is, the communication system only needs to include a storage that stores one or more content items.

INDUSTRIAL APPLICABILITY

The present disclosure can shorten the waiting time of the user for establishing the connection between the receiving device and the information processing device at the time of reproducing the recorded program, which is stored in the receiving device, by the information processing device, and the present disclosure is useful for a system that performs operations for reproducing the recorded program. Specifically, the present disclosure is applicable to a hard disk recorder, a DVD recorder, a BD recorder, a TV, a portable terminal and the like.

The invention claimed is:

1. A communication system comprising:
    a receiving device that stores one or more content items;
    a server; and
    an information processing device for reproducing the content items,
    wherein the information processing device includes:
    a display information receiver that receives display information for displaying a content list, which contains a list of the one or more content items, from the server through a first connection made based on a first communication mode;
    a communication establishment unit that establishes a second connection between the receiving device and the information processing device, the second connection being made based on a second communication mode for performing communication between the receiving device and the information processing device without passing via the server;
    a content selector that selects at least one content item out of the one or more content items based on the display information; and
    a content receiver that receives the at least one content item, selected by the content selector, from the receiving device through the second connection established by the communication establishment unit,
    wherein after the communication establishment unit starts to establish the second connection between the receiving device and the information processing device and before the second connection is established, the display information receiver receives the display information from the server through the first connection.

2. The communication system according to claim 1, wherein
    the server includes:
    a content list receiver that receives the content list from the receiving device; and
    a display information converter that converts the content list into the display information, and
    the display information includes information for controlling an expression format of the content list.

3. The communication system according to claim 2, wherein the one or more content items include a broadcast program recorded by the receiving device.

4. The communication system according to claim 1, wherein the one or more content items include a broadcast program recorded by the receiving device.

5. An information processing device comprising:
    a display information receiver that receives display information for displaying a content list, which contains a list of one or more content items, through a first connection made based on a first communication mode;
    a communication establishment unit that establishes a second connection made based on a second communication mode different from the first communication mode;
    a content selector that selects at least one content item out of the one or more content items based on the display information; and
    a content receiver that receives the at least one content item, selected by the content selector, through the second connection established by the communication establishment unit,
    wherein after the communication establishment unit starts to establish the second connection between a receiving device and the information processing device and before the second connection is established, the display information receiver receives the display information from a server through the first connection.

6. A communication method in a communication system including a receiving device that stores one or more content items, a server, and an information processing device for reproducing the content items, the communication method comprising:
    establishing a second connection, the second connection being made based on a second communication mode for performing communication between the receiving device and the information processing device without passing via the server;
    transmitting display information for displaying a content list, which contains a list of the one or more content items, from the server to the information processing device through a first connection, after starting to establish the second connection and before the second connection is established;

selecting at least one content item out of the one or more content items based on the display information; and transmitting the at least one selected content item from the receiving device to the information processing device through the established second connection.

* * * * *